(12) United States Patent
Kobayashi (10) Patent No.: US 9,917,497 B2
(45) Date of Patent: Mar. 13, 2018

(54) LINEAR POWER GENERATOR

(76) Inventor: Takaitsu Kobayashi, Chiba (JP)

( * ) Notice: Subject to any disclaimer, the term of this patent is extended or adjusted under 35 U.S.C. 154(b) by 767 days.

(21) Appl. No.: 13/634,285

(22) PCT Filed: Apr. 1, 2011

(86) PCT No.: PCT/JP2011/058407
§ 371 (c)(1),
(2), (4) Date: Sep. 12, 2012

(87) PCT Pub. No.: WO2011/125931
PCT Pub. Date: Oct. 13, 2011

(65) Prior Publication Data
US 2013/0001959 A1 Jan. 3, 2013

(30) Foreign Application Priority Data
Apr. 5, 2010 (JP) .................. 2010-087340

(51) Int. Cl.
*H02K 35/02* (2006.01)
*F01B 11/00* (2006.01)
*F01K 27/00* (2006.01)

(52) U.S. Cl.
CPC ............ *H02K 35/02* (2013.01); *F01B 11/002* (2013.01); *F01K 27/005* (2013.01)

(58) Field of Classification Search
USPC .......... 122/459; 60/595, 596, 511, 512, 514; 318/135; 290/1 R; 310/30, 14, 34
See application file for complete search history.

(56) References Cited

U.S. PATENT DOCUMENTS 3,988,901 A * 11/1976 Shelton .................. F25B 27/00
62/116
4,009,587 A * 3/1977 Robinson, Jr. ............ F25B 1/00
62/116
(Continued)

FOREIGN PATENT DOCUMENTS

DE WO 9925955 A1 * 5/1999 ............. F01K 19/02
JP 57-97006 6/1982
(Continued)

OTHER PUBLICATIONS

WO9925955A1—machine translation.*
International Search Report dated Jul. 5, 2011 in International (PCT) Application No. PCT/JP2011/058407.

*Primary Examiner* — Nathaniel Herzfeld
(74) *Attorney, Agent, or Firm* — Wenderoth, Lind & Ponack, L.L.P.

(57) ABSTRACT

A linear power generator has a gas pressure cylinder structure which causes reciprocating motion of a piston in an axial direction by supplying a high-pressure gas alternately to a left gas chamber and a right gas chamber of a cylinder which includes an electromotive coil, and alternately applying a gas pressure in the left gas chamber and a gas pressure in the right gas chamber to the piston which includes a permanent magnet in the cylinder, and which induces power generation of the electromotive coil by way of reciprocating motion of the piston which has the permanent magnet in the axial direction. The linear power generator encourages movement of the piston by supplying a first high-pressure gas into the left gas chamber and the right gas chamber, and keeps moving the piston by supplying a second high-pressure gas for supplementing the first high-pressure gas into the left gas chamber and the right gas chamber.

20 Claims, 8 Drawing Sheets (56) References Cited

U.S. PATENT DOCUMENTS

| | | | | |
|---|---|---|---|---|
| 4,012,910 | A * | 3/1977 | Schuman | F02G 1/0435 417/207 |
| 4,454,426 | A * | 6/1984 | Benson | 290/1 R |
| 4,965,864 | A * | 10/1990 | Roth et al. | 318/135 |
| 5,002,020 | A * | 3/1991 | Kos | 123/46 E |
| 6,748,907 | B2 * | 6/2004 | Malmquist | B60K 6/46 123/46 E |
| 6,931,845 | B2 * | 8/2005 | Schaeffer | F02B 71/045 60/413 |
| 7,318,506 | B1 * | 1/2008 | Meic | 290/1 A |
| 2005/0081804 | A1 * | 4/2005 | Graf | B60K 6/24 123/46 E |
| 2009/0101005 | A1 * | 4/2009 | Pohl et al. | 92/85 B |
| 2010/0277012 | A1 * | 11/2010 | Kobayashi | B60K 6/24 310/30 |
| 2013/0033042 | A1 * | 2/2013 | Fortier et al. | 290/54 |
| 2013/0088018 | A1 * | 4/2013 | Kobayashi | 290/1 A |

FOREIGN PATENT DOCUMENTS

| | | | |
|---|---|---|---|
| JP | 2001-523786 | 11/2001 | |
| JP | 2009-189185 | 8/2009 | |
| JP | 2009-189243 | 8/2009 | |
| JP | WO 2009098970 A1 * | 8/2009 | B60K 6/24 |
| WO | 91/02886 | 3/1991 | |
| WO | 99/25955 | 5/1999 | |
| WO | WO 9925955 A1 * | 5/1999 | |

* cited by examiner

LINEAR POWER GENERATOR

BACKGROUND OF INVENTION

Technical Field

The present invention relates to a linear power generator which induces power generation between a piston and a cylinder which form a gas pressure cylinder.

Background Art

Following Patent Literature 1 discloses a linear power generator which causes reciprocating motion of a piston by supplying a high-pressure gas alternately to left and right gas chambers of a cylinder which has an electromotive coil, and which induces power generation in the electromotive coil by way of the reciprocating motion of the piston which has a permanent magnet in an axial direction.

The linear power generator has a high-pressure gas supply valves in left and right end walls of the cylinder, and repeats an operation of supplying a high-pressure gas into the left gas chamber through a left high-pressure gas supply valve, applying this gas pressure to the left pressure receiving plane of the piston, moving the piston rightward in the axial direction, then supplying the high-pressure gas to the right gas chamber through a right high-pressure gas supply valve when the piston reaches the end upon rightward movement, applying the gas pressure to the right pressure receiving plane of the piston, and moving the piston leftward in the axial direction.

CITATION LIST

Patent Literature

Patent Literature 1: Japanese Patent Application No. 2009-189185

Technical Problem

Above Patent Literature 1 discloses a linear power generator which induces power generation in the electromotive coil by supplying a high-pressure gas alternately to a left gas chamber and a right gas chamber of a cylinder which has an electromotive coil, alternately applying a gas pressure in the left gas chamber and a gas pressure in the right gas chamber to the piston which has the permanent magnet in the cylinder, and causing reciprocating motion of the piston in the axial direction.

SUMMARY OF INVENTION

To induce stable power generation in the linear power generator, it is necessary to continuously and stably move the piston in the cylinder at a constant stroke. The present invention enables smooth movement of the piston and stable power generation when moving the piston by the high-pressure gas by supplying the high-pressure gas (second high-pressure gas) for supplementing the high-pressure gas (first high-pressure gas), and causing both of the high-pressure gases to work together.

Further, the present invention provides a linear power generator which enables smooth movement of a piston and stable power generation by efficiently using heat energy of the first high-pressure gas supplied into the cylinder.

Solution to Problem

In summary, a linear power generator according to the present invention which adopts a gas pressure cylinder structure which causes reciprocating motion of a piston in an axial direction by supplying a high-pressure gas alternately to a left gas chamber and a right gas chamber of a cylinder which has an electromotive coil, and alternately applying a gas pressure in the left gas chamber and a gas pressure in the right gas chamber to the piston which has a permanent magnet in the cylinder and which induces power generation of the electromotive coil by way of the reciprocating motion of the piston which has the permanent magnet in the axial direction, and the linear power generator encourages movement of the piston by supplying a first high-pressure gas into the left and right gas chambers, and keeps moving the piston by supplying a second high-pressure gas for supplementing the first high-pressure gas, into the left and right gas chambers.

The second high-pressure gas is supplied after the movement of the piston is started by the first high-pressure gas. Preferably, a supply of the second high-pressure gas is stopped when the first high-pressure gas is supplied, and a supply of the first high-pressure gas is stopped when the second high-pressure gas is supplied.

Further, the second high-pressure gas is a gas which is noncondensable at a condensation point of the first high-pressure gas, and is a gas which is noncondensable at a freezing point of the first high-pressure gas. More specifically, the first high-pressure gas is steam, and the second high-pressure gas is air or a mix gas of air and steam.

Advantageous Effects of Invention

The present invention can smoothly move a piston and induce stable power generation by causing the first high-pressure gas and the second high-pressure gas to work together. Further, even when a cylinder and a piston stroke have limited lengths, it is possible to induce desired power generation.

Furthermore, by employing a configuration of keeping moving the piston by supplying the second high-pressure gas after movement of the piston is started by the first high-pressure gas, it is possible to smoothly supply the second high-pressure gas at a comparatively low supply pressure while expanding a gas chamber.

More specifically, by stopping supplying the second high-pressure gas when the first high-pressure gas is supplied, and stopping supplying the first high-pressure gas when the second high-pressure gas is supplied, it is possible to efficiently supplement the gases.

Further, when, for example, the second high-pressure gas is a gas which is noncondensable at a condensation point of the first high-pressure gas or a gas which is noncondensable at a freezing point of the first high-pressure gas, so that the second high-pressure gas recovers condensation heat or freezing heat discharged from the first high-pressure gas, this heat recovery swells the second high-pressure gas and this gas pressure is applied to the piston.

DESCRIPTION OF EMBODIMENTS

The best embodiment for implementing the present invention will be described below based on FIGS. 1 to 6.

Figure 1:
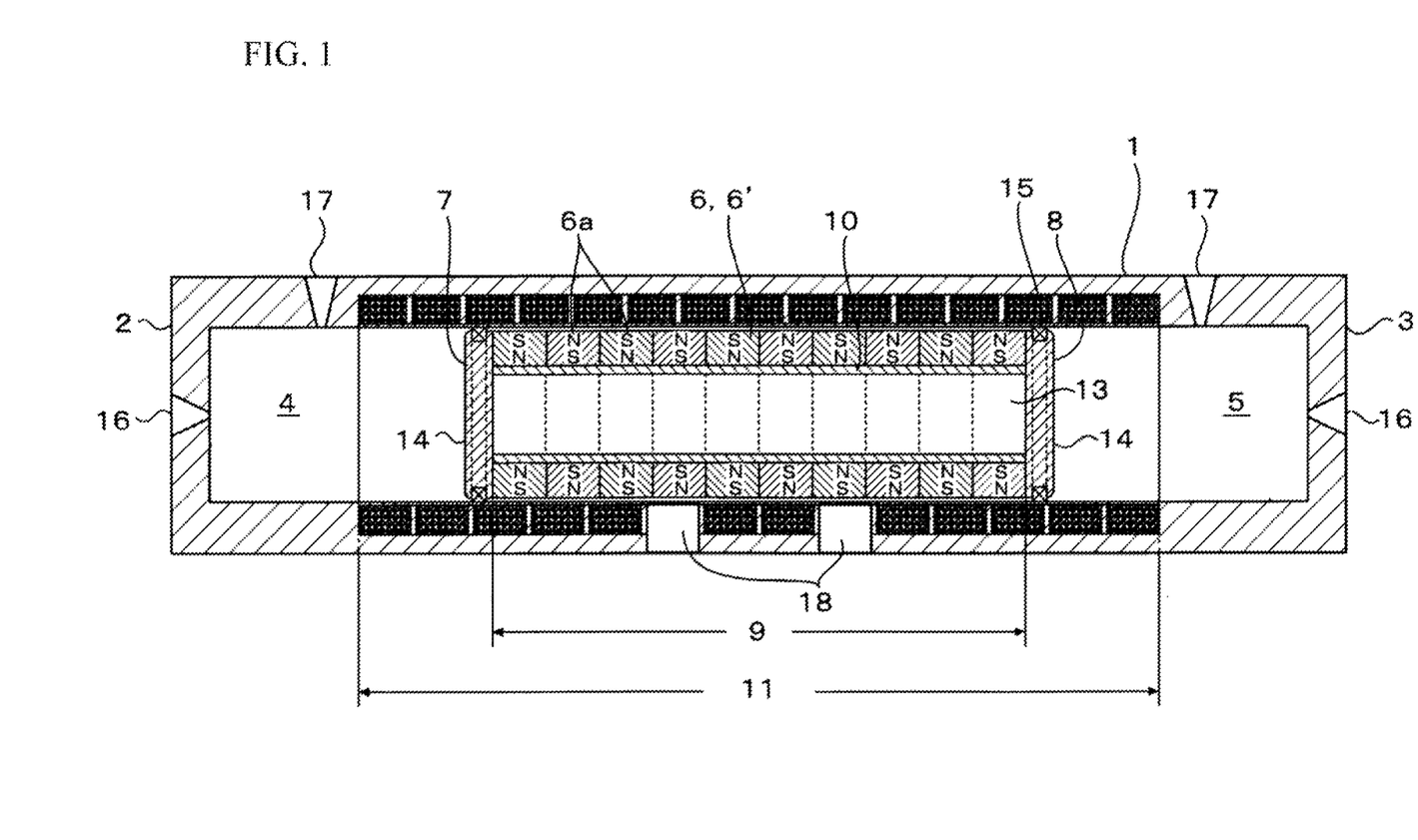
FIG. 1 is a vertical sectional view of a linear power generator according to the present invention.

A linear power generator according to the present invention adopts a gas pressure cylinder structure which causes reciprocating motion of a piston 6 in an axial direction by alternately applying a gas pressure in a left gas chamber 4 which is in contact with a left end wall 2 of a cylinder 1 and a gas pressure in a right gas chamber 5 which is in contact with a right end wall 3, to the piston (free piston) 6 in the cylinder 1.

The linear power generator according to the present invention adopts the gas pressure cylinder structure, and employs a configuration where a permanent magnet zone 9 is formed between a left pressure receiving plane 7 which is in contact with the left gas chamber 4 of the piston 6 and a right pressure receiving plane 8 which is in contact with the right gas chamber 5, an electromotive coil zone 11 is formed over the left and right gas chambers 4 and 5 in a cylinder wall between the left and right end walls 2 and 3 of the cylinder 1, and power generation is induced in the electromotive coil zone 11 by way of reciprocating motion of the piston 6 which has the permanent magnet zone 9 in the axial direction.

A configuration is employed of causing reciprocating motion of the piston 6 in the axial direction by alternately supplying a first high-pressure gas G1 and a second high-pressure gas G2 for supplementing the first high-pressure gas G1 into the left gas chamber 4, supplying the first high-pressure gas G1 and the second high-pressure gas G2 for supplementing the first high-pressure gas G1 into the right gas chamber 5, and causing gas pressures of the first and second high-pressure gases G1 and G2 to work together.

Meanwhile, steam is used for the first high-pressure gas G1. Alternatively, it is also possible to use a high-pressure heated gas such as carbon dioxide or air. Further, air or a mix gas of air and steam is used for the second high-pressure gas G2. Alternatively, it is possible to use a high-pressure gas such as nitrogen gas.

For example, the second high-pressure gas G2 is a gas which is noncondensable at a condensation point of the first high-pressure gas G1, or a gas which is noncondensable at a freezing point of the first high-pressure gas G1. When this second high-pressure gas G2 is used, condensation heat or freezing heat discharged from the first high-pressure gas G1 is recovered by the second high-pressure gas G2, this heat recovery swells the second high-pressure gas G2, and this gas pressure is applied to the piston 6.

With the above example, although the condensation point of the second high-pressure gas G2 is lower than the condensation point or the freezing point of the first high-pressure gas G1, when the difference between the condensation point, and the condensation point or the freezing point is greater, a heat recovery effect improves.

The cylinder 1 is provided with tapered first supply ports 16 in the left and right end walls 2 and 3, tapered second supply ports 17 are provided in the cylinder wall with intervals from the left and right end walls 2 and 3, and waistless exhausts 18 are provided in an intermediate portion of the cylinder wall.

Figure 2A:
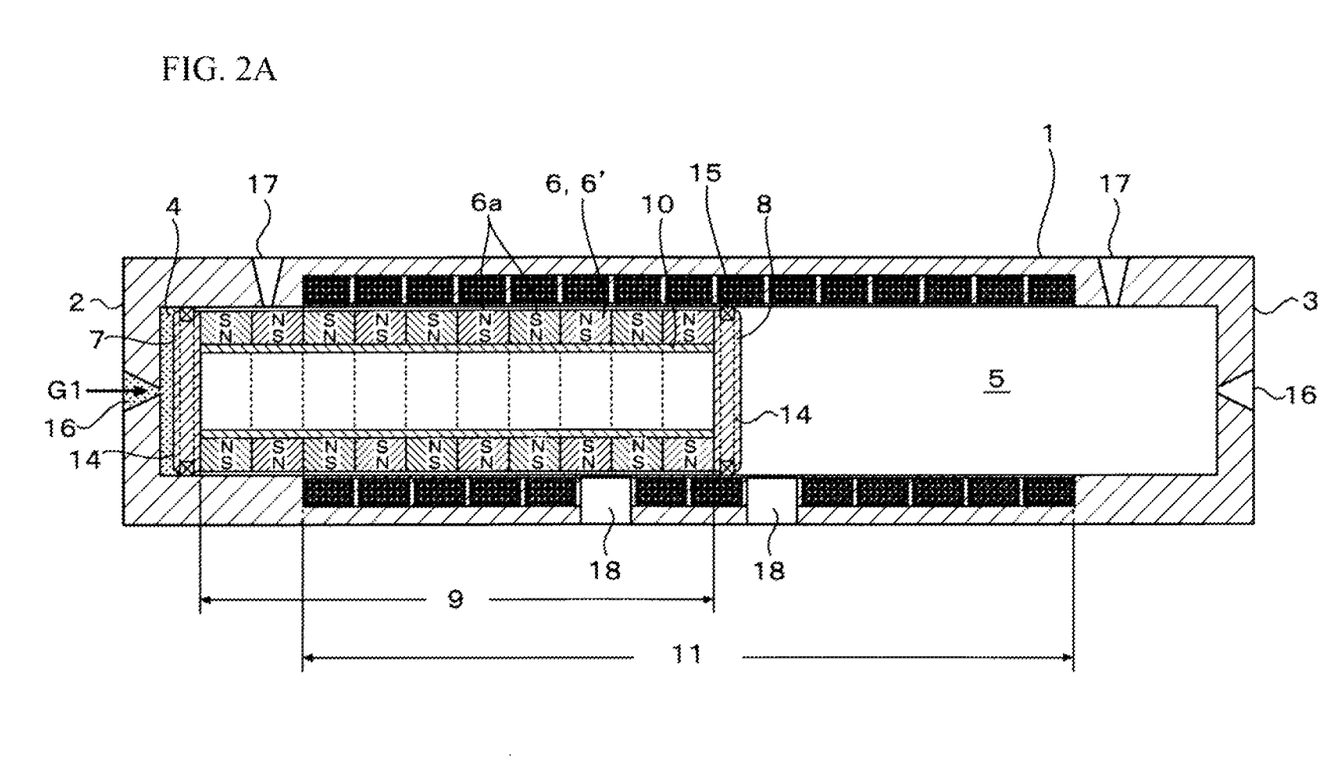
FIG. 2A is a vertical sectional view illustrating a first operation of a piston when a first high-pressure gas is supplied in the linear power generator.
Figure 2B:
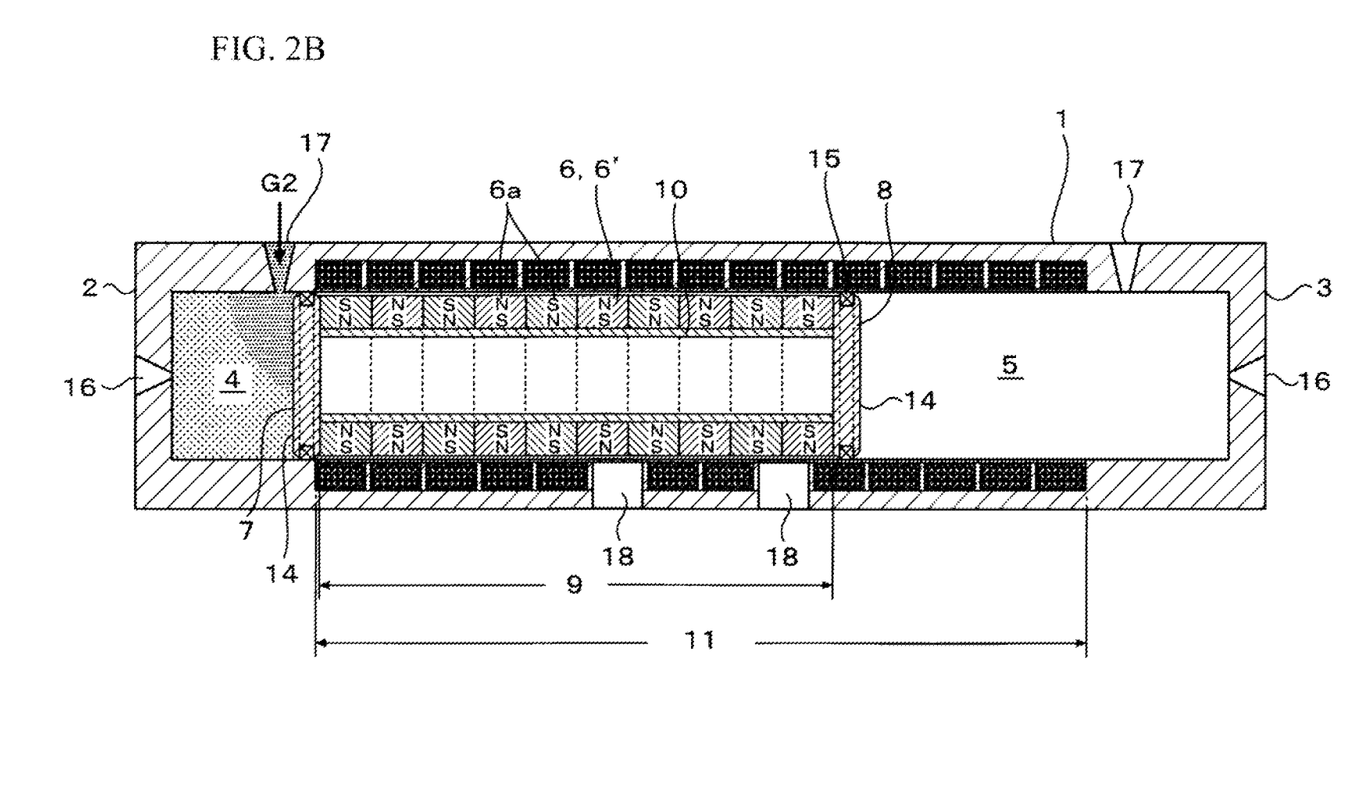
FIG. 2B is a vertical sectional view illustrating a second operation of a piston when a second high-pressure gas is supplied in the linear power generator.

As illustrated in FIG. 2A, when the piston 6 moves to the leftmost end in FIG. 2A, the second supply port 17 and the exhaust 18 which are in contact with the left gas chamber 4 is closed by the piston 6, and, as illustrated in FIG. 2B, while the piston 6 moves rightward in FIG. 2A, the second supply port 17 is opened, so that it is possible to supply the second high-pressure gas G2 into the left gas chamber 4. Further, as illustrated in FIG. 2C, when the piston 6 moves to the rightmost end in FIG. 2C, the exhaust 18 is opened, so that it is possible to discharge the first and second high-pressure gases G1 and G2 from the left gas chamber 4.

Figure 2C:
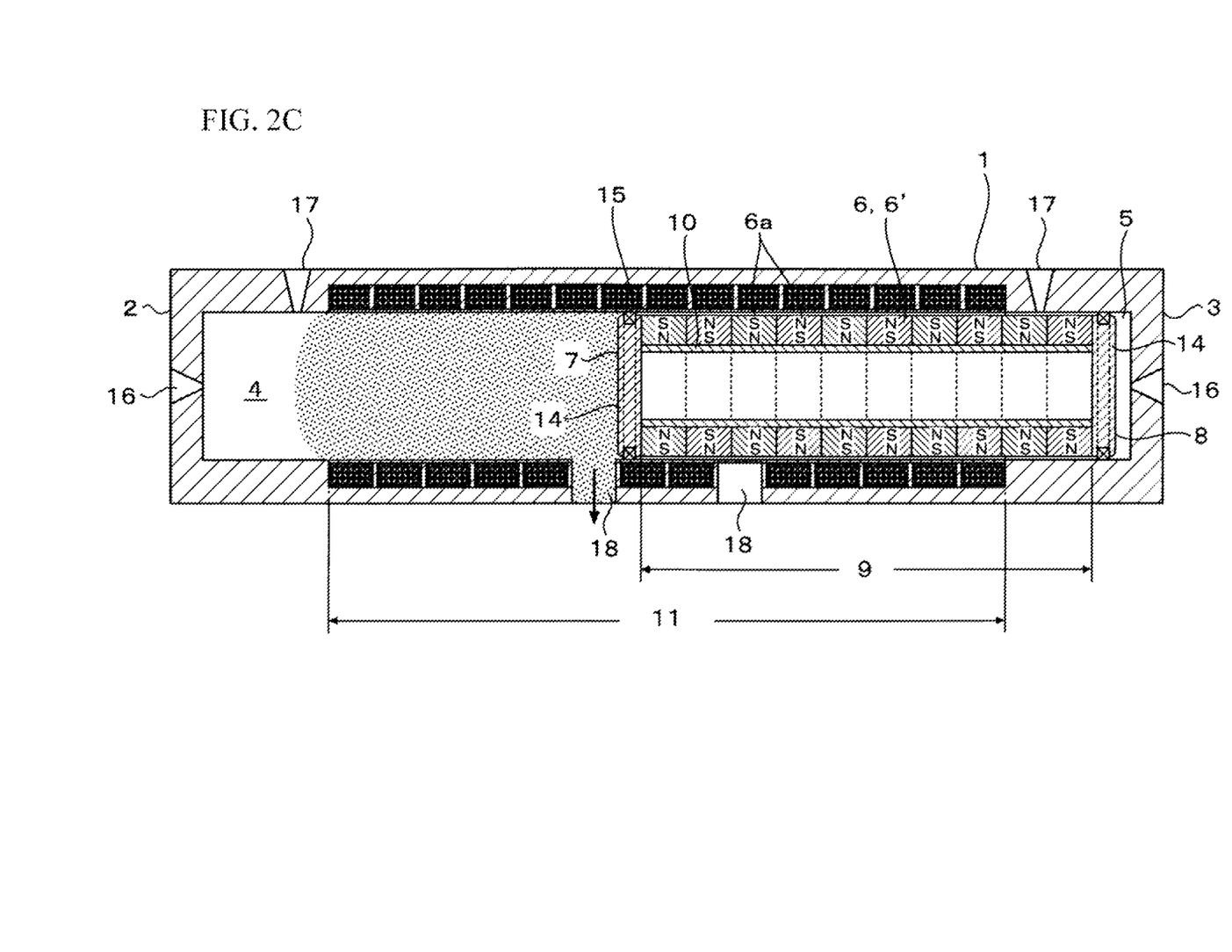
FIG. 2C is a vertical sectional view illustrating a third operation of a piston when the first high-pressure gas and the second high-pressure gas are discharged in the linear power generator.

Similarly, when the piston 6 is moving to the rightmost end in FIG. 2C, the second supply port 17 and the exhaust 18 which are in contact with the right gas chamber 5 are closed by the piston 6 and, while the piston 6 moves leftward in FIG. 2C, the second supply port 17 is opened, so that it is possible to supply the second high-pressure gas G2 into the right gas chamber 5. Further, when the piston 6 moves to the leftmost end in FIG. 2C, the exhaust 18 is opened, so that it is possible to discharge the first and second high-pressure gases G1 and G2 from the right gas chamber 5.

Figure 3:
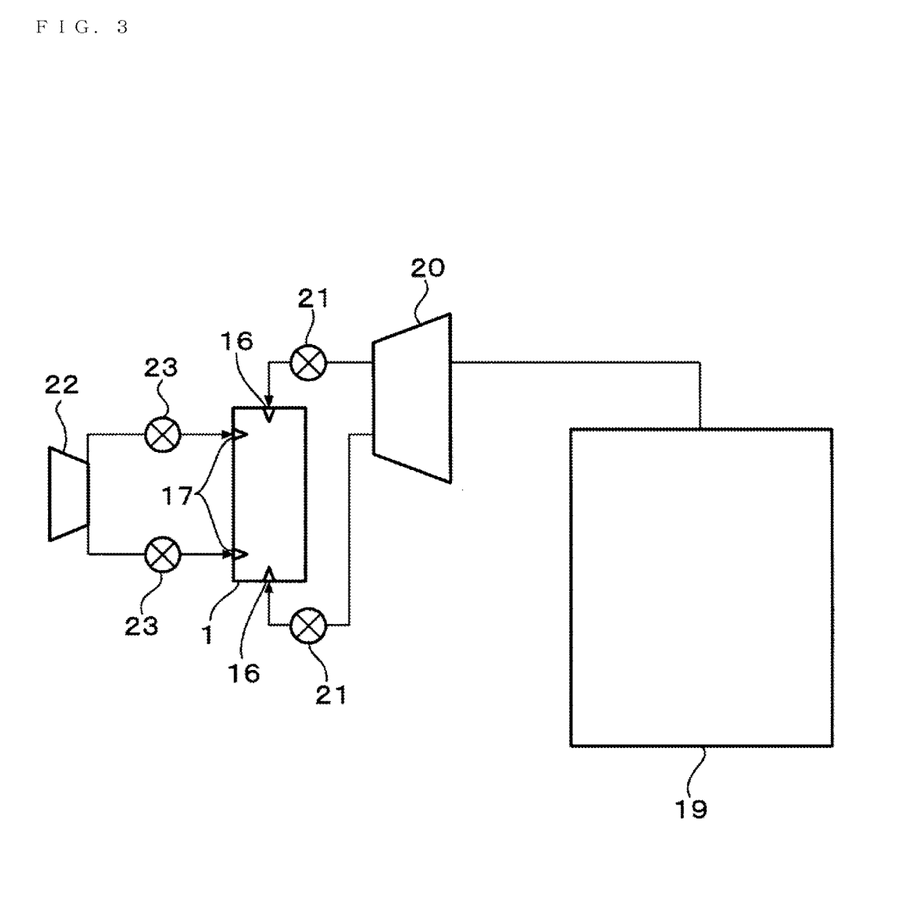
FIG. 3 is a view schematically illustrating a switch flow path of the first high-pressure gas and the second high-pressure gas.

As illustrated in FIG. 3, when, for example, steam is used for the first high-pressure gas G1, the first high-pressure gas G1 is pressurized by a steam generator 19 through a compressor 20, and is supplied alternately to the first supply ports 16 of the left and right chambers 4 and 5 through flow path change-over valves 21.

That is, when the first high-pressure gas G1 is supplied into the left gas chamber 4, one flow path change-over valve 21 is opened with respect to a flow path to the left gas chamber 4, and the other flow path change-over valve 21 is closed with respect to the flow path to the right gas chamber 5. Further, similarly, when the first high-pressure gas G1 is supplied into the right gas chamber 5, the other flow path change-over valve 21 is opened with respect to the flow path to the right gas chamber 5, and one flow path change-over valve 21 is closed with respect to the flow path to the left gas chamber 4. The flow path change-over valve 21 switches between gas flow paths, and the same flow path switching operation can be performed even by providing a single bidirectional change-over valve in an outlet of the compressor 20.

Further, when, for example, air is used for the second high-pressure gas G2, the second high-pressure gas G2 is taken in from the atmosphere and is pressurized through a compressor 22, and is supplied alternately to the second supply ports 17 of the left and right gas chambers 4 and 5 through flow path change-over valves 23.

That is, when the second high-pressure gas G2 is supplied into the left gas chamber 4, one flow path change-over valve 23 is opened with respect to the flow path to the left gas chamber 4, and the other flow path change-over valve 23 is closed with respect to the flow path to the right gas chamber 5. Further, similarly, when the second high-pressure gas G2 is supplied to the right gas chamber 5, the other flow path change-over valve 23 is opened with respect to the flow path to the right gas chamber 5, and one flow path change-over valve 23 is closed with respect to the flow path to the left gas chamber 4. The flow path change-over valve 23 switches between gas flow paths, and the same flow path switching operation can be performed even by providing a single bidirectional change-over valve in an outlet of the compressor 22.

The flow path change-over valves are operated to stop supplying the second high-pressure gas G2 when the first high-pressure gas G1 is supplied and stop supplying the first high-pressure gas G1 when the second high-pressure gas G2 is supplied, so that the second high-pressure gas G2 efficiently supplements the first high-pressure gas G1.

The piston 6 adopts a cylindrical piston structure which fits a permanent magnet cylinder 6' adopting a structure in which a plurality of rings 6a made of permanent magnets are integrally and coaxially layered, to the outer surface of a cylindrical yoke 10, and in which opening surfaces at both ends of cylindrical holes 13 of the cylindrical yoke 10 and are closed by pressure receiving end plates 14. By increasing or decreasing the number of layers of the rings 6a, it is possible to increase or decrease the length of the piston (permanent magnet zone 9).

Further, the polarity of the permanent magnet cylindrical body 6' is arranged according to a known electromagnetic induction principle such that a magnetic line of a permanent magnet effectively functions with respect to an electromotive coil of the electromotive coil zone 11. In addition, in some cases, the electromotive coil for forming the electromotive coil zone 11 is formed with a plurality of unit electromotive coil groups according to the polarity arrangement.

An annular seal 15 is provided to an outer peripheral surface of the pressure receiving end plate 14 to seal the inner peripheral surface of the cylinder 1 airtight. In addition, although not illustrated, the annular seal 15 may be provided in the outer peripheral surfaces at both ends of the permanent magnet cylindrical body 6'.

Preferably, the pressure receiving end plate 14 is formed with a heat resistant plate such as a ceramic plate, a fiber plate, a stone plate, a concrete plate, a carbon plate or a metal plate.

An operation of causing reciprocating motion of the piston 6 by supplying the first and second high-pressure gases G1 and G2 from an outside to the left and right gas chambers 4 and 5 will be described based on FIGS. 2A to 2C.

As illustrated in FIG. 2A, the first high-pressure gas G1 is supplied into the left gas chamber 4 through the left first supply port 16, and the gas pressure of the first high-pressure G1 is applied to the left pressure receiving plane 7 of the pressure receiving end plate 14 to encourage movement of the piston 6 rightward in the axial direction. In addition, a supply of the second high-pressure gas G2 is stopped in this case.

Next, as illustrated in FIG. 2B, when the piston 6 starts moving and passes the second supply port 17, the second high-pressure gas G2 for supplementing the first high-pressure gas G1 is additionally supplied into the left gas chamber 4, and the second high-pressure gas G2 supplements the first high-pressure gas G1 to keep moving the piston 6. By this means, it is possible to expand the left gas chamber 4, and smoothly supply the second high-pressure gas G2 at a comparatively low supply pressure. In addition, a supply of the first high-pressure gas G1 is stopped in this case.

Although, with the present embodiment, a timing to supply the second high-pressure gas G2 is adjusted by providing the second supply ports 17 with intervals from the left and right end walls 2 and 3, the present invention is by no means limited to this, and may be configured to adjust supply timings of both supply ports using, for example, change-over valves by, for example, providing the second supply ports 17 near the first supply ports 16 of the left and right end walls 2 and 3.

The second high-pressure gas G2 supplements the first high-pressure gas G1, so that it is possible to smoothly move the piston 6 and, as a result, induce stable power generation.

When a gas which is noncondensable at a condensation point of the first high-pressure gas G1 or a gas which is noncondensable at a freezing point of the first high-pressure gas is used for the second high-pressure gas G2, condensation heat or freezing heat discharged from the first high-pressure gas G1 at the condensation point or the freezing point is recovered by the second high-pressure gas G2, this heat recovery swells the second high-pressure gas G2, and the gas pressure is applied to the piston 6 to keep moving the piston 6.

Consequently, it is possible to efficiently use heat energy of the first high-pressure gas G1 supplied into the left gas chamber 4 by way of the heat recovery, and smoothly move the piston and stably generate power.

Next, as illustrated in FIG. 2C, when the piston 6 reaches the end upon rightward movement, the first high-pressure gas G1 or a denatured material deriving from the first high-pressure gas G1, and the second high-pressure gas G2 are discharged from the exhausts 18.

After the first and second high-pressure gases G1 and G2 are discharged from the left gas chamber 4, the first high-pressure gas G1 is supplied into the right gas chamber 5 through the right first supply port 16, and the gas pressure of the first high-pressure gas G1 is applied to the right pressure receiving plane 8 of the pressure receiving end plate 14 to encourage leftward movement of the piston 6 in the axial direction and keep moving the piston 6 to the end upon leftward movement similar to the above rightward movement.

By repeating the above operation, the permanent magnet cylindrical body 6' (permanent magnet zone 9) which forms the piston 6 repeatedly makes reciprocating motion to induce power generation in the electromotive coil zone 11.

As described above, the first high-pressure gas G1 does not need to be supplied at all times when the piston 6 is moving, and a supply of the first high-pressure gas G1 is stopped when the second high-pressure gas G2 is supplied. Hence, it is only necessary to supply the amount of the first high-pressure gas G1 that can encourage initial movement of the piston 6 in a stopped state. Further, the second high-pressure gas G2 to be supplied later supplements the first high-pressure gas G1 to keep moving the piston 6.

Similarly, a supply of the second high-pressure gas G2 is stopped when the first high-pressure gas G1 is supplied. By this means, it is possible to efficiently supplement the first high-pressure gas G1 by means of the second high-pressure gas G2.

A timing to supply and a timing to stop supplying the high-pressure gases G1 and G2 apply to a case where there is a time when both of the high-pressure gases G1 and G2 are doubly supplied. Further, these timings also apply to a case where a supply of the first high-pressure gas G1 is stopped when the second high-pressure gas G2 is supplied, or the pressure and a supply amount of the first high-pressure gas G1 are reduced without stopping the supply and the supply is continued.

Figure 4:
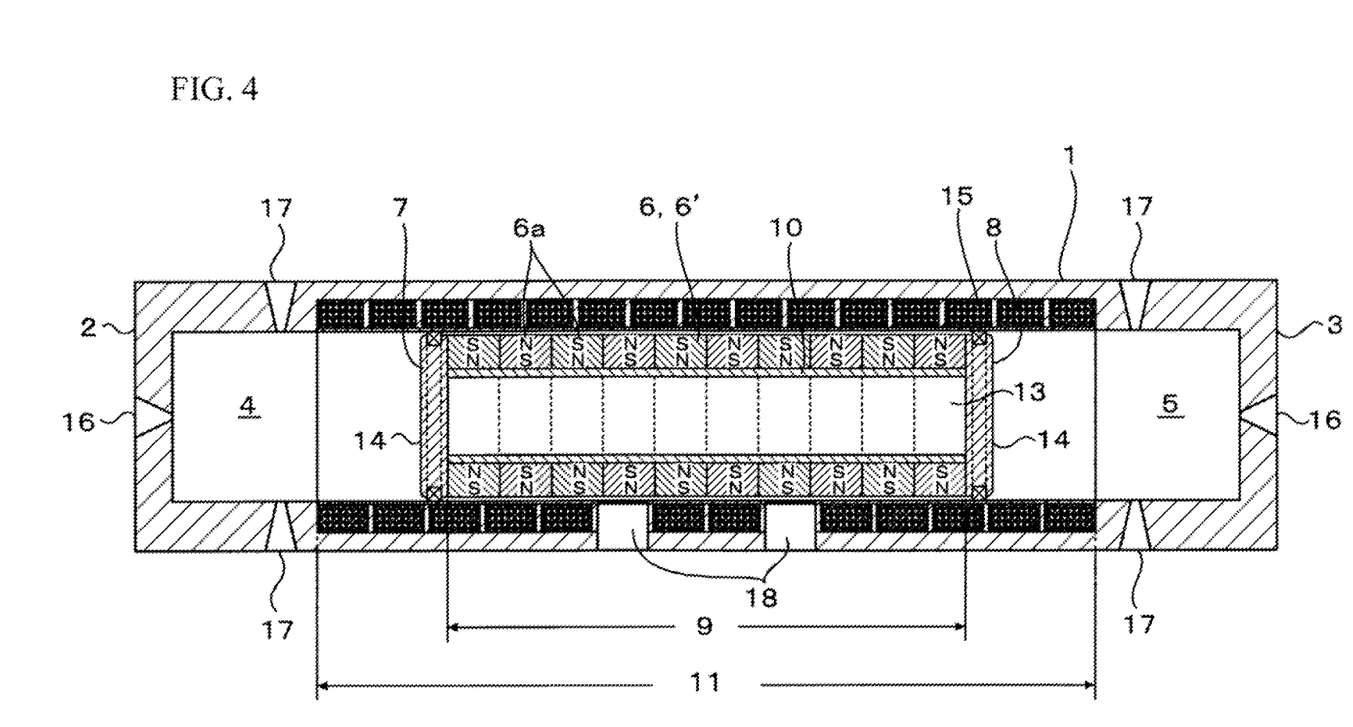
FIG. 4 is a vertical sectional view illustrating an example where a plurality of second supply ports are provided.
Figure 5:
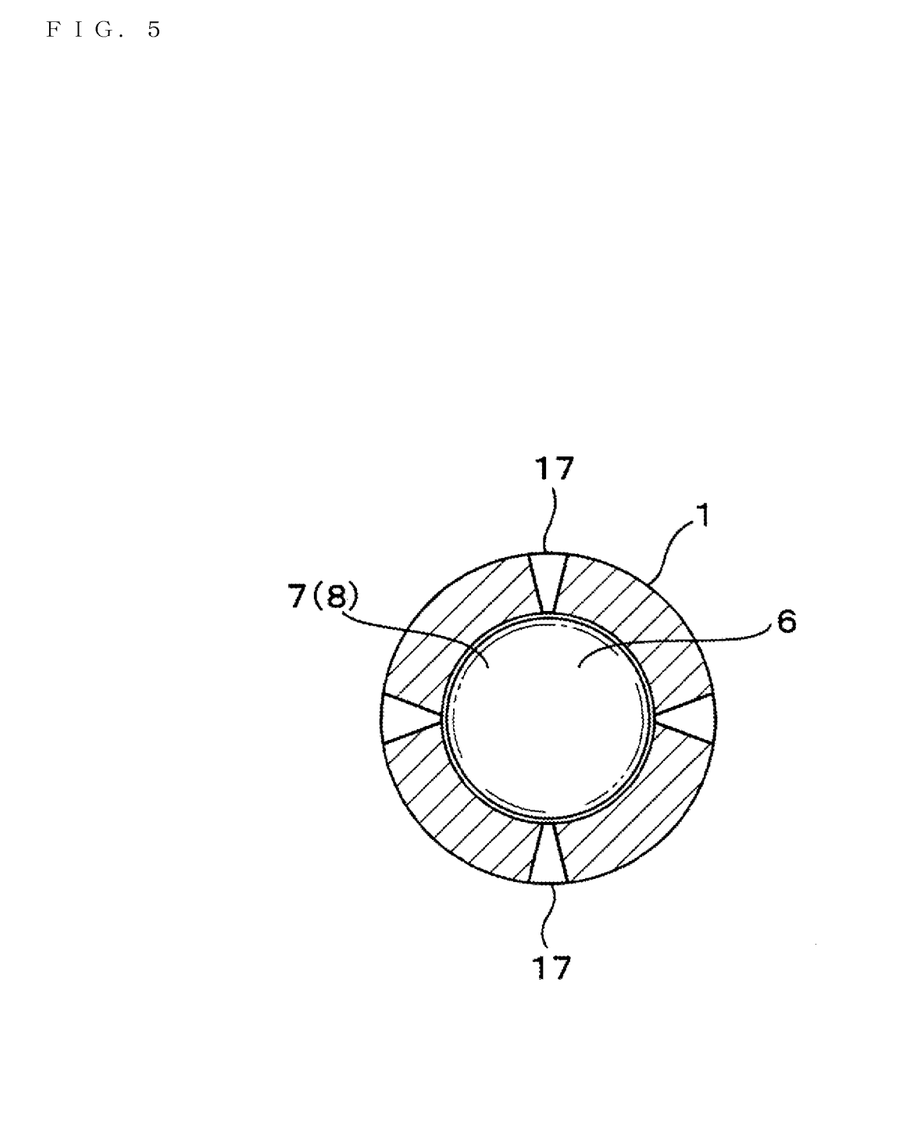
FIG. 5 is a horizontal sectional view illustrating an example where a plurality of second supply ports are provided.

FIGS. 4 and 5 illustrate examples where a plurality of second supply ports 17 are provided in cylinder walls which define the left and right gas chambers 4 and 5.

A plurality of second supply ports 17 are provided, so that it is possible to start supplementing the first high-pressure gas G1 by means of the second high-pressure gas G2 at a plurality of sites.

Figure 6:
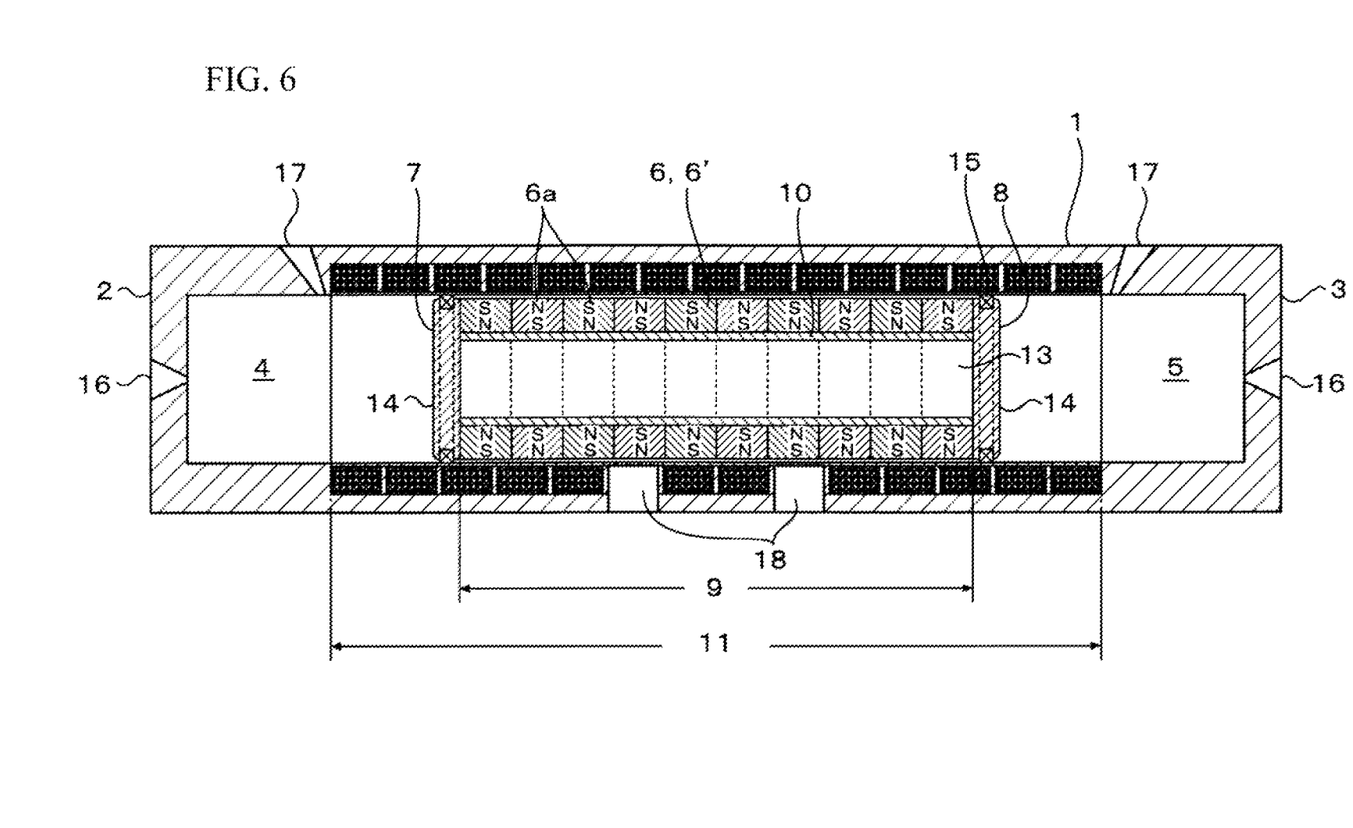
FIG. 6 is a vertical sectional view illustrating an example where the second supply ports are arranged toward a piston pressure receiving plane at an inclined angle.

FIG. 6 illustrates an example where the second supply ports 17 are arranged toward the left and right pressure receiving planes 7 and 8 of the piston 6 at an inclined angle. That is, the second supply ports 17 are arranged inclining at a clearance angle with respect to the axis of the cylinder 1.

By arranging the second supply ports 17 toward the left and right pressure receiving planes 7 and 8 of the piston 6 at the inclined angle as described above, it is possible to reduce the influence of an inner pressure on the second high-pressure gas G2, and smoothly supply the second high-pressure gas G2. Further, it is possible to provide a plurality of inclined second supply ports 17 in the cylinder walls which define the left and right gas chambers 4 and 5. Furthermore, it is possible to shift positions of a plurality of second supply ports 17 in a cylinder axial direction, and arrange the second supply ports.

As described above, the present invention can smoothly move the piston 6, and induce stable power generation by causing the first high-pressure gas G1 and the second high-pressure gas G2 to work together. Further, by limiting the lengths of the cylinder 1 and the piston stroke, that is, the lengths of the left and right gas chambers 4 and 5 of the cylinder 1 in the axial direction, it is possible to induce desired power generation.

REFERENCE SIGNS LIST

1 . . . CYLINDER, 2 . . . LEFT END WALL, 3 . . . RIGHT END WALL, 4 . . . LEFT GAS CHAMBER, 5 . . . RIGHT GAS CHAMBER, 6 . . . PISTON, 6' . . . PERMANENT MAGNET CYLINDER, 6a . . . RING, 7 . . . LEFT PRESSURE RECEIVING PLANE, 8 . . . RIGHT PRESSURE RECEIVING PLANE, 9 . . . PERMANENT MAGNET ZONE, 10 . . . CYLINDRICAL YOKE, 11 . . . ELECTROMOTIVE COIL ZONE, 13 . . . CYLINDRICAL HOLE, 14 . . . PRESSURE RECEIVING END PLATE, 15 . . . ANNULAR SEAL, 16 . . . FIRST SUPPLY PORT, 17 . . . SECOND SUPPLY PORT, 18 . . . EXHAUST, 19 . . . STEAM GENERATOR, 20 . . . COMPRESSOR, 21 . . . FLOW PATH CHANGE-OVER VALVE, 22 . . . COMPRESSOR, 23 . . . FLOW PATH CHANGE-OVER VALVE, G1 . . . FIRST HIGH-PRESSURE GAS, G2 . . . SECOND HIGH-PRESSURE GAS

The invention claimed is:

1. A linear power generator comprising:
a gas pressure cylinder structure comprising a cylinder and a piston,
the cylinder comprising a left gas chamber, a right gas chamber, an electromotive coil, first supply ports in a left end wall of the cylinder and a right end wall of the cylinder, second supply ports in a wall of the cylinder with intervals from the left end wall and the right end wall, and
the piston comprising a permanent magnet;
wherein the gas pressure cylinder structure is configured to cause reciprocating motion of the piston in an axial direction by supplying a high-pressure gas alternately to the left gas chamber and the right gas chamber, and alternately applying a gas pressure in the left gas chamber and a gas pressure in the right gas chamber to the piston, and is configured to induce power generation of the electromotive coil through the reciprocating motion of the piston in the axial direction,
wherein the linear power generator is configured to cause movement of the piston by supplying a first high-pressure gas into the left gas chamber and the right gas chamber, and is configured to keep moving the piston by supplying a second high-pressure gas for supplementing the gas pressure of the first high-pressure gas into the left gas chamber and the right gas chamber;
wherein the movement of the piston is caused by the first high-pressure gas and the second high-pressure gas only supplements the first high-pressure gas;
wherein the first high-pressure gas is supplied through the first supply ports;
wherein the second high-pressure gas is supplied through the second supply ports; and
wherein, in a state in which the piston starts moving by the first high-pressure gas through the first supply ports and passes the second supply ports, the second high-pressure gas is supplied.

2. The linear power generator according to claim 1, wherein the linear power generator is configured to stop supplying the second high-pressure gas in a state in which the first high-pressure gas is supplied, and is configured to stop supplying the first high-pressure gas in a state in which the second high-pressure gas is supplied.

3. The linear power generator according to claim 1, wherein the second high-pressure gas is a gas which is noncondensable at a condensation point of the first high-pressure gas, and is a gas which is noncondensable at a freezing point of the first high-pressure gas.

4. The linear power generator according to claim 3, wherein the first high-pressure gas is steam, and the second high-pressure gas is air or a mix gas of air and steam.

5. The linear power generator according to claim 1, wherein the first high-pressure gas and the second high-pressure gas are supplied through different compressors.

6. The linear power generator according to claim 2, wherein the second high-pressure gas is a gas which is noncondensable at a condensation point of the first high-pressure gas, and is a gas which is noncondensable at a freezing point of the first high-pressure gas.

7. The linear power generator according to claim 2, wherein the first high-pressure gas and the second high-pressure gas are supplied through different compressors.

8. The linear power generator according to claim 3, wherein the first high-pressure gas and the second high-pressure gas are supplied through different compressors.

9. The linear power generator according to claim 1, wherein the first supply ports are tapered.

10. The linear power generator according to claim 1, wherein the second supply ports are tapered.

11. The linear power generator according to claim 1, wherein the second supply ports are in a first wall of the cylinder and exhausts are provided in an intermediate portion of a second wall of the cylinder opposite to the first wall of the cylinder.

12. The linear power generator according to claim 1, further comprising a yoke, wherein the permanent magnet is layered to an outer surface of the yoke.

13. The linear power generator according to claim 12, wherein the yoke is entirely hollow such that one continuous space extends axially inside the yoke from a first terminal end of the yoke to a second terminal end of the yoke.

14. The linear power generator according to claim 12, wherein no support member is included inside the yoke.

15. The linear power generator according to claim 12, further comprising a pressure receiving end plate, wherein a hole at an end of the yoke is closed by the pressure receiving end plate.

16. The linear power generator according to claim 15, further comprising a seal provided on an outer peripheral surface of the pressure receiving end plate.

17. The linear power generator according to claim 1, further comprising a seal provided on an outer peripheral surface of the permanent magnet.

18. The linear power generator according to claim 1, further comprising a cylindrical yoke, wherein the permanent magnet is a permanent magnet cylinder in which rings made of permanent magnets are integrally and coaxially layered to an outer surface of the cylindrical yoke.

19. The linear power generator according to claim 1, wherein the linear power generator has one and only one piston.

20. The linear power generator according to claim 1, wherein the piston does not include a piston rod.

* * * * *